United States Patent
Muff et al.

(10) Patent No.: US 8,239,439 B2
(45) Date of Patent: *Aug. 7, 2012

(54) METHOD AND APPARATUS IMPLEMENTING A MINIMAL AREA CONSUMPTION MULTIPLE ADDEND FLOATING POINT SUMMATION FUNCTION IN A VECTOR MICROPROCESSOR

(75) Inventors: Adam J. Muff, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

This patent is subject to a terminal disclaimer.

(21) Appl. No.: 11/955,679

(22) Filed: Dec. 13, 2007

(65) Prior Publication Data

US 2009/0158013 A1 Jun. 18, 2009

(51) Int. Cl.
*G06F 7/38* (2006.01)

(52) U.S. Cl. .......................... 708/490; 708/523; 712/222

(58) Field of Classification Search .................. None
See application file for complete search history.

(56) References Cited

U.S. PATENT DOCUMENTS

| | | | |
|---|---|---|---|
| 3,299,261 A | 1/1967 | Steigerwalt, Jr. | |
| 5,226,171 A | 7/1993 | Hall et al. | |
| 5,375,078 A | 12/1994 | Hrusecky et al. | |
| 6,922,716 B2 | 7/2005 | Desai et al. | |
| 6,996,596 B1 | 2/2006 | Ho et al. | |
| 7,475,222 B2 | 1/2009 | Glossner et al. | |
| 2006/0041610 A1 | 2/2006 | Hokenek et al. | |
| 2006/0253519 A1 | 11/2006 | Tran | |
| 2009/0049113 A1 | 2/2009 | Muff et al. | |

*Primary Examiner* — Lewis A Bullock, Jr.
*Assistant Examiner* — Michael D Yaary
(74) *Attorney, Agent, or Firm* — Patterson & Sheridan LLP

(57) ABSTRACT

Embodiments of the invention provide methods and apparatus for executing a multiple operand instruction. Executing the multiple operand instruction comprises transferring more than two operands to a vector unit, each operand being transferred to a respective one of a plurality of processing lanes of the vector unit. The operands may be transferred from the vector unit to a dot product unit wherein an arithmetic operation using the more than two operands may be performed.

22 Claims, 7 Drawing Sheets

|  | CYCLE 1 | CYCLE 2 | CYCLE 3 | CYCLE 4 | CYCLE 5 | CYCLE 6 | CYCLE 7 | CYCLE 8 |
|---|---|---|---|---|---|---|---|---|
| | A + B | | | | | | | |
| | | A + B | | | | | | |
| | | | A + B | | | | | |
| 601 | | | | A + B | | | | |
| | | stall | stall | stall | +C | | | |
| | | | | | | +C | | |
| 602 | | | | | | | +C | |
| | | | | | | | | +C |

FIG. 6A

| CYCLE 1 | CYCLE 2 | CYCLE 3 | CYCLE 4 | CYCLE 5 | CYCLE 6 | CYCLE 7 | CYCLE 8 |
|---------|---------|---------|---------|---------|---------|---------|---------|
| A + B + C | | | | | | | |
| | A + B + C | | | | | | |
| | | A + B + C | | | | | |
| | | | A + B + C | | | | |
| | | | | A + B + C | | | |
| | | | | | A + B + C | | |
| | | | | | | (DONE) | |

METHOD AND APPARATUS IMPLEMENTING A MINIMAL AREA CONSUMPTION MULTIPLE ADDEND FLOATING POINT SUMMATION FUNCTION IN A VECTOR MICROPROCESSOR

BACKGROUND OF THE INVENTION

1. Field of the Invention

The present invention generally relates to data processing, and more specifically to an instruction set for obtaining an arithmetic result of multiple operands.

2. Description of the Related Art

Computer software applications generally include a set of instructions for manipulating and processing data. Manipulating and processing data may involve performing one or more arithmetic operations on the data such as, for example, adding one or more numbers to obtain a sum of the numbers. Modern computer systems generally include scalar units, vector units, or shared vector/scalar units that are capable of performing operations on data. A scalar unit may perform scalar operations such as, for example, addition, subtraction, division, multiplication, and the like. A vector unit may perform vector operations such as, for example, dot product and cross product operations. Each of the scalar and vector units may receive one or more operands as an input. The scalar and vector units may process the operands to generate a desired result.

SUMMARY OF THE INVENTION

The present invention generally relates to data processing, and more specifically to an instruction set for obtaining an arithmetic result of multiple operands.

One embodiment of the invention provides a method for computing an arithmetic result of more than two operands. The method generally comprises transferring more than two operands from a register file to a vector unit in response to receiving a multiple operand instruction, wherein each operand is transferred to a respective one of a plurality of processing lanes of the vector unit. The method further comprises transferring each of the more than two operands from respective processing lanes of the vector unit to a dot product unit, and computing an arithmetic result of the more than two operands in the dot product unit.

Another embodiment of the invention provides a method for computing a sum of three operands. The method generally comprises transferring three operands from a register file to a vector unit in response to receiving a three addend instruction, wherein each of the three operands are transferred to a respective one of a plurality of processing lanes of the vector unit. The method further comprises transferring each of the three operands from respective processing lanes of the vector unit to a dot product unit, and computing a sum of the three operands in the dot product unit.

Yet another embodiment of the invention provides a system generally comprising a plurality of processors communicably coupled with one another. Each processor generally comprises a register file comprising a plurality of registers, each register comprising a plurality of operands and a vector unit comprising a plurality of vector processing lanes and configured to receive more than two operands, each operand being received in a respective one of a plurality of processing lanes of the vector unit, and transfer the more than two operands to a dot product unit. The processor further comprises the dot product unit configured to receive each of the more than two operands from respective processing lanes of the vector unit and compute an arithmetic result of the more than two operands.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6A illustrates an exemplary timing diagram for computing an arithmetic result using more than two operands.

FIG. 6B illustrates another exemplary timing diagram for computing an arithmetic result using more than two operands.

DETAILED DESCRIPTION OF THE PREFERRED EMBODIMENTS

Embodiments of the invention provide methods and apparatus for executing a multiple operand instruction. Executing the multiple operand instruction comprises transferring more than two operands to a vector unit, each operand being transferred to a respective one of a plurality of processing lanes of the vector unit. The operands may be transferred from the vector unit to a dot product unit wherein an arithmetic operation using the more than two operands may be performed.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

EXEMPLARY SYSTEM

Figure 1:
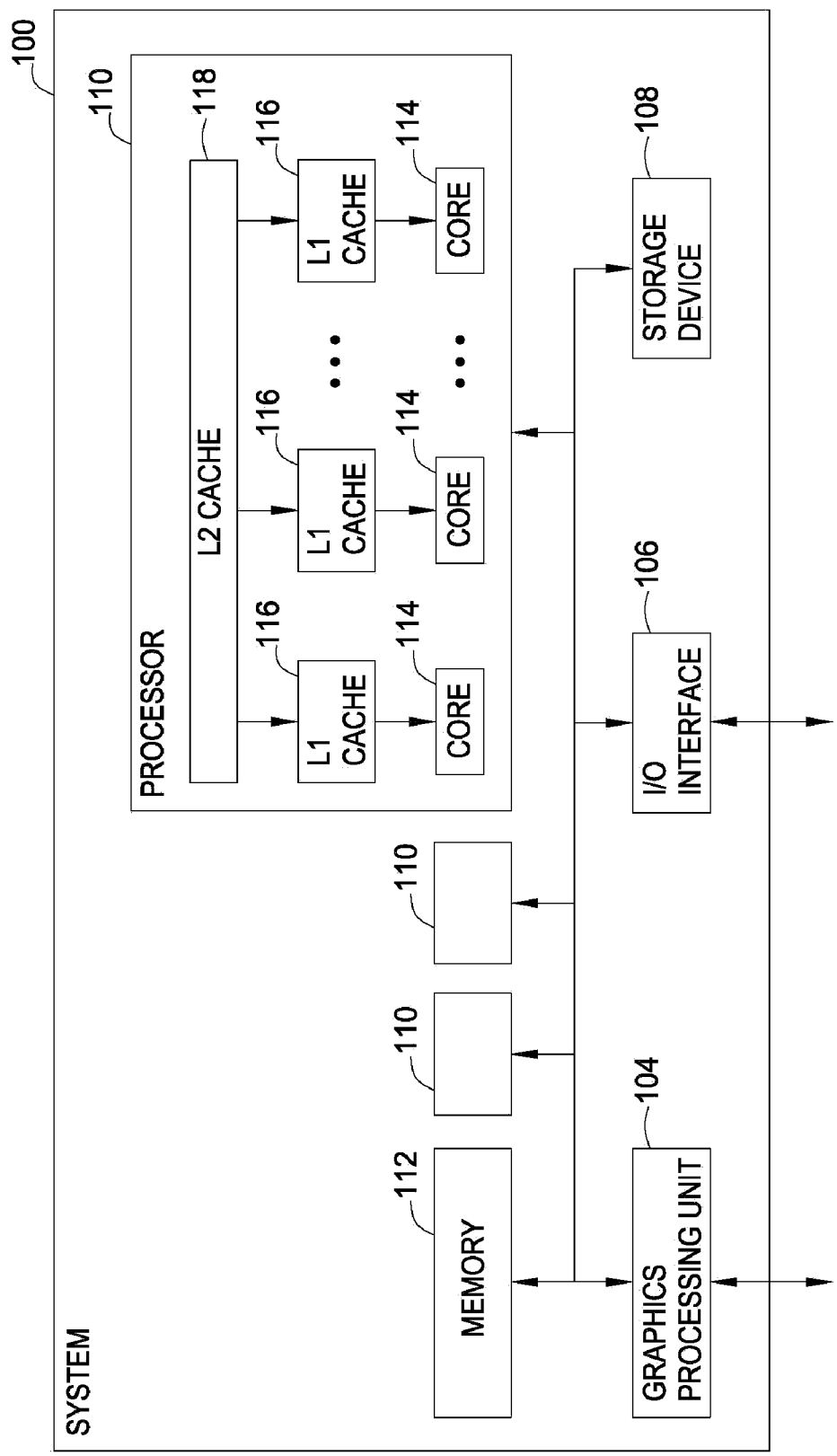
FIG. 1 illustrates an exemplary system according to an embodiment of the invention.

FIG. 1 illustrates an exemplary system 100 according to an embodiment of the invention. As illustrated, system 100 includes a plurality of processors 110, memory 112, graphics processing unit (GPU) 104, input/output (IO) interface 106, and a storage device 108. The memory 112 is preferably a random access memory sufficiently large to hold the necessary programming and data structures operated on by processor 110. While memory 112 is shown as a single entity, it should be understood that memory 112 may in fact comprise a plurality of modules, and that memory 112 may exist at multiple levels, for example, L3 cache, L4 cache, and main memory.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 108 could be part of one virtual address space spanning multiple primary and secondary storage devices.

IO interface 106 may provide an interface between the processors 110 and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 104 may be configured to receive graphics data, for example, 2-Dimensional and 3-Dimensional graphics data, from a processor 110. GPU 104 may perform one or more computations to manipulate the graphics data, and render images on a display screen.

Processor 110 may include a plurality of processor cores 114. Processors cores 114 may be configured to perform pipelined execution of instructions retrieved from memory 112. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 116. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the respective processor core 114.

In one embodiment of the invention, L1 cache 116, and L2 cache 118 may be SRAM based devices. However, one skilled in the art will recognize that L1 cache 116 and L2 cache 118 may be any other type of memory, for example, DRAM. One skilled in the art will also recognize that one or more higher levels of cache, for example, L3 cache and L4 cache may also be included in system 100. Each higher level cache may be associated with one or more caches of the next lower level.

Figure 2:
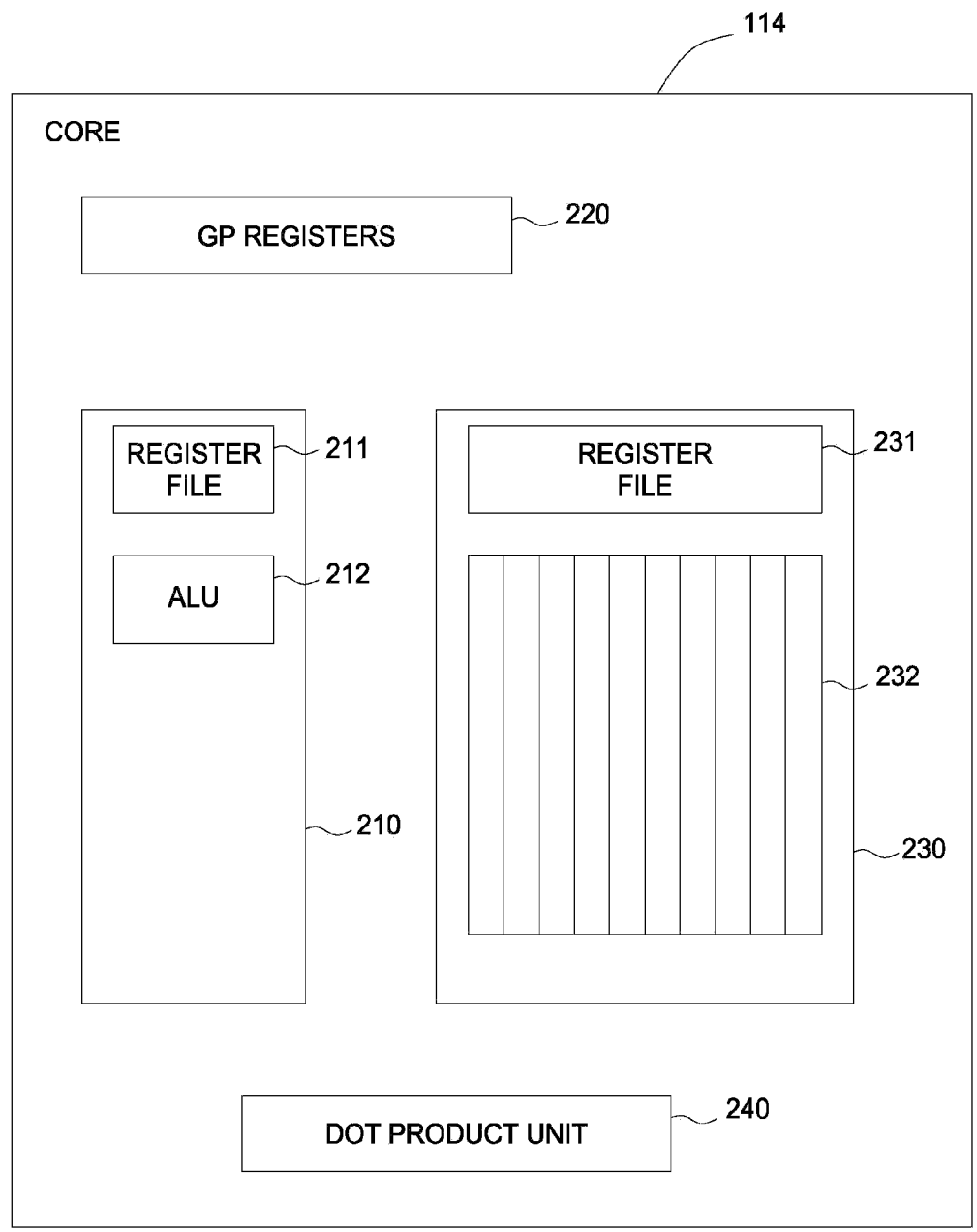
FIG. 2 illustrates an exemplary processor core according to an embodiment of the invention.

FIG. 2 is a more detailed diagram of components of a processor core 114 according to an embodiment of the invention. Processor core 114 may include a set of general purpose (GP) registers 220 for storing data. Processor core 114 may also include one or more processing subunits for performing one or more operations on data in response to receiving an instruction. For example, processor core 114 may include one or more scalar units 210, one or more vector units 230, and/or one or more dot product units 240.

Scalar unit 210 may comprise a register file 211 and an arithmetic and logic unit (ALU) 212. Register file 211 may contain data and addresses that may be manipulated by the scalar unit 210. In one embodiment of the invention, ALU 212 may be configured to operate on a pair of operands to produce a result. Scalar operations may include, for example, arithmetic operations such as addition and subtraction. The result produced by a scalar unit 210 may be stored in the register file 211, register file 231, and/or general purpose registers 230. In one embodiment of the invention, scalar unit 210 may be configured to perform pipelined execution of scalar instructions.

The vector unit 230 may include a set of registers 231, and a set of parallel pipelines 232 for operating on data in registers 231. Pipelines 232 may include one or more arithmetic pipelines configured to perform arithmetic operations, for example, floating point calculations and fixed point calculations. Pipelines 232 may also contain one or more load/store pipelines for transferring data between GP registers 220 or registers 231 on the one hand and some form of memory (generally L1 Cache or L2 Cache) on the other. Additional pipelines, such as an instruction fetch and decode pipeline, may also exist within processor core 114. In addition to components shown in FIG. 2, processor core 114 may include additional special purpose registers and counters, load and store hardware for fetching data from or storing it to cache or memory, control hardware, and so forth.

The dot product unit 240 may be configured to perform one or more operations associated with computing a dot product of two vectors. A dot product operation produces a scalar value that is independent of the coordinate system and represents an inner product of the Euclidean space. The equation below describes a dot product operation performed between the previously described vectors A and B, wherein vector A may be represented by coordinates $[x_a, y_a, z_a]$, and vector B may be represented by coordinates $[x_b, y_b, z_b]$:

$$A \cdot B = x_a \cdot x_b + y_a \cdot y_b + z_a \cdot z_b$$

In one embodiment of the invention, the each of the products $x_a*x_b$, $y_a*y_b$, and $z_a*z_b$ may be computed in the parallel pipelines of the vector unit. The dot product unit may compute the sum of the products $x_a*x_b$, $y_a*y_b$, and $z_a*z_b$ to generate the dot product.

While the scalar unit 210 and vector unit 230 are shown as separate and independent units in FIG. 2, in some embodiments of the invention, the vector and scalar units may be integrated into a single unit. For example, in one embodiment, a predetermined processing lane of the vector unit may be dedicated to execute scalar instructions. An integrated register file may be provided with an integrated vector/scalar unit to store vector and scalar operands. By integrating the vector/scalar unit and an integrated register file, high latency memory accesses for exchanging data between register files in separate vector and scalar units may be avoided.

During execution of instructions a combined vector/scalar unit may process both vector and scalar instructions. While executing a scalar instruction, one or more scalar operands may be manipulated in the predetermined scalar processing lane of the vector/scalar unit. On the other hand, while processing vector instructions, a plurality of vector and/or scalar operands may be manipulated in one or more of a plurality of processing lanes of the vector/scalar unit.

Scalar units, vector units, and vector/scalar units generally operate on two operands at a time while performing a scalar operation. Therefore, for example, to obtain a sum of more than two operands, multiple add instructions may be issued. For example, a spread sheet application may include a column containing three numbers. If a sum of the three numbers in the column is desired, the spread sheet application must issue a first add instruction to add a pair of the numbers, and a dependent second add instruction to add the sum of the pair of numbers to the third number.

Such methods of computing a sum by issuing multiple two-operand add instructions can result in stall cycles in a processor computing a sum of multiple numbers because of dependencies between subsequent add instructions computing the sum. Furthermore, the sum computed by a first add instruction may be stored in a temporary register to make the sum available to a second add instruction, thereby potentially making a valuable temporary register unavailable for other purposes.

Embodiments of the invention provide a scalar instruction capable of computing a sum of more than two operands by using unused vector processing lanes and the dot product unit during execution of the scalar instruction. Each of the more than two operands may be passed to a dot product unit via a respective vector processing lane. The more than two operands may be aligned and summed by the dot product unit to compute a sum of the more than two operands. Therefore, embodiments of the invention improve efficiency of a system by using unused vector processing lanes of a vector/scalar unit while processing a scalar instruction.

While various components of processor core 114 have been described and shown at a high level, it should be understood that the processor of the preferred embodiment contains many other components not shown, which are not essential to an understanding of the present invention. Furthermore, it will be understood that the processor core of FIG. 2 is simply one example of a processor architecture, and that many variations could exist in the number, type and arrangement of components within processor core 114, that components not shown may exist in addition to those depicted, and that not all components depicted might be present in a processor design. For example, the number and function of execution unit pipelines may vary; registers may be configured in different arrays and sets; dedicated floating point hardware may or may not be present; etc. Moreover, in some embodiments, the GPU 104 may contain one or features similar to those of the processor 110 such as, for example, a processor core comprising vector, scalar, and/or combined vector scalar units, and the like.

Figure 3:
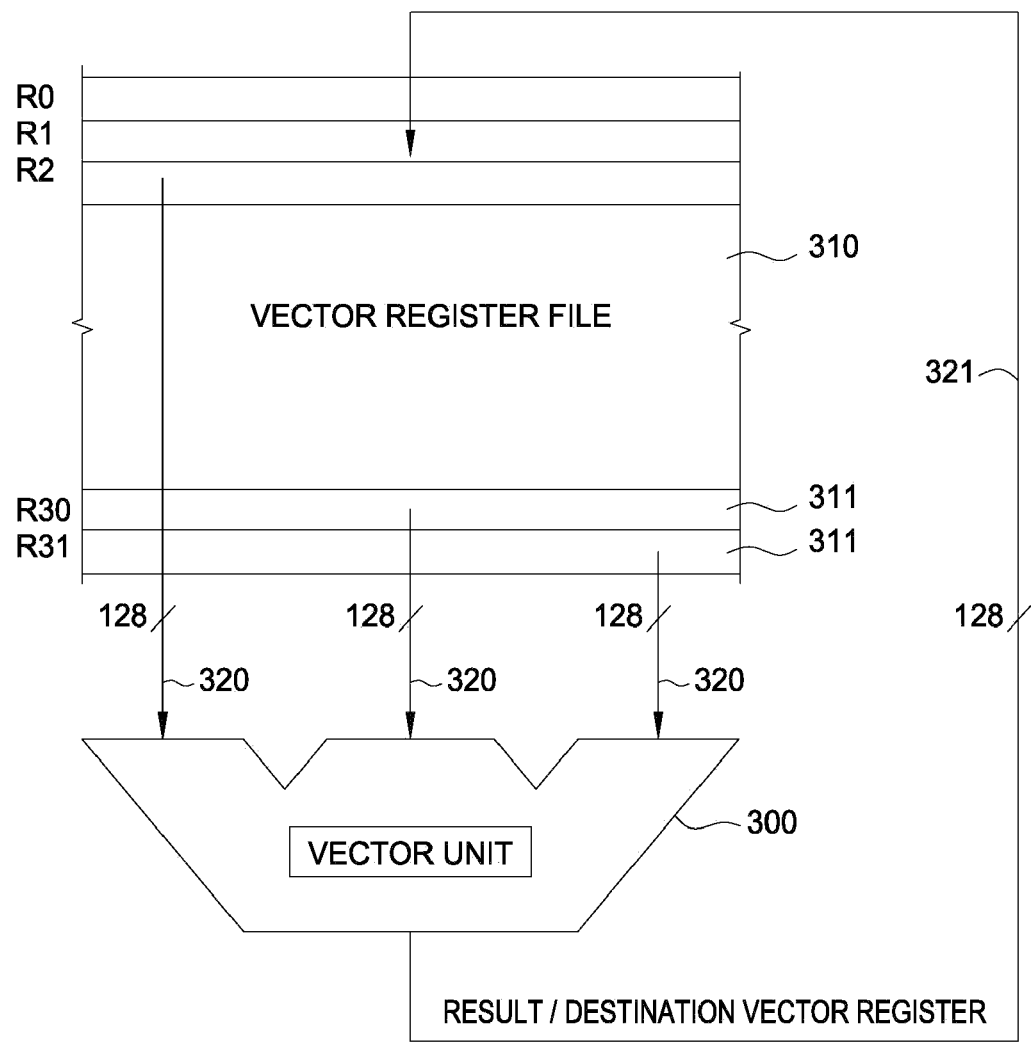
FIG. 3 illustrates an exemplary vector unit according to an embodiment of the invention.

FIG. 3 illustrates a more detailed view of an exemplary vector/scalar unit (hereinafter referred to simply as vector unit) 300 and an associated register file 310. Vector unit 300 may be configured to execute single instruction multiple data (SIMD) instructions. In other words, vector unit 300 may operate on one or more operands to produce a single scalar or vector result while processing vector or scalar instructions. For example, vector unit 300 may perform parallel operations on data elements that comprise one or more vectors or scalars to produce a scalar or vector result.

A plurality of operands operated on by the vector unit may be stored in register file 310. For example, in FIG. 3, register file 310 provides 32 128-bit registers 311 (R0-R31). In one embodiment, registers 311 may include vector data, for example, vector coordinates, pixel data, transparency, and the like. However, registers 311 may also be configured to store scalar data. Data may be exchanged between register file 310 and memory, for example, cache memory, using load and store instructions. Accordingly, register file 310 may be communicably coupled with a memory device, for example, a Dynamic Random Access memory (DRAM) device and or a cache (SRAM) device.

A plurality of lanes 320 may connect register file 310 to vector unit 300. Each lane may be configured to provide input from a register file to the vector unit. For example, in FIG. 3, three 128 bit lanes connect the register file to the vector unit 700. In this manner, the contents of any 3 registers from register file 310 may be provided to the vector unit at a time.

The results of an operation performed by the vector unit 300 may be written back to register file 310. For example, a 128 bit lane 321 provides a write back path to write results computed by vector unit 300 back to any one of the registers 311 of register file 310.

Figure 4:
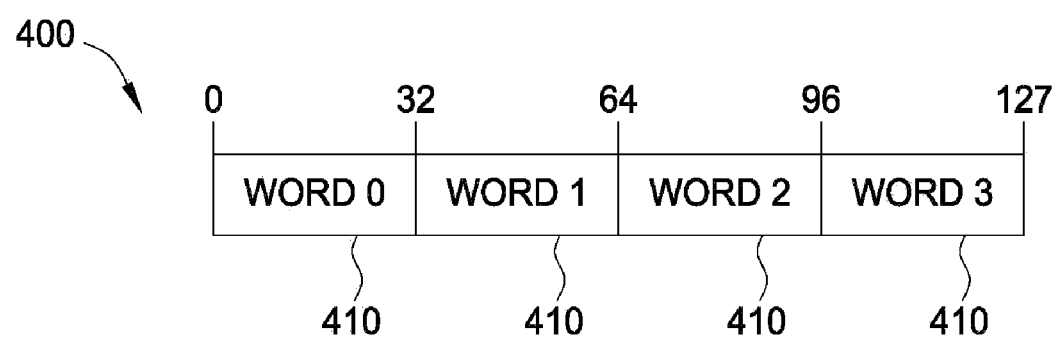
FIG. 4 illustrates an exemplary register according to an embodiment of the invention.

Each of registers 311 may be configured to store a plurality of operands. FIG. 4 illustrates the structure of an exemplary register 400 comprising one or more operands. Register 400 may correspond to a register 311 illustrated in FIG. 3. As illustrated in FIG. 4, register 400 comprises a plurality of sections 410, wherein each section comprises a vector or scalar operand.

In one embodiment, register 400 may be a 128 bit register. Register 400 may be divided into four 32 bit word sections: WORD 0, WORD 1, WORD 2, and WORD 3, as illustrated. WORD 0 may include bits 0-31, WORD 1 may include bits 32-63, WORD 2 may include bits 64-95, and WORD 3 may include bits 96-127, as illustrated. However, one skilled in the art will recognize that register 400 may be of any reasonable length and may include any number of sections of any reasonable length.

Figure 5:
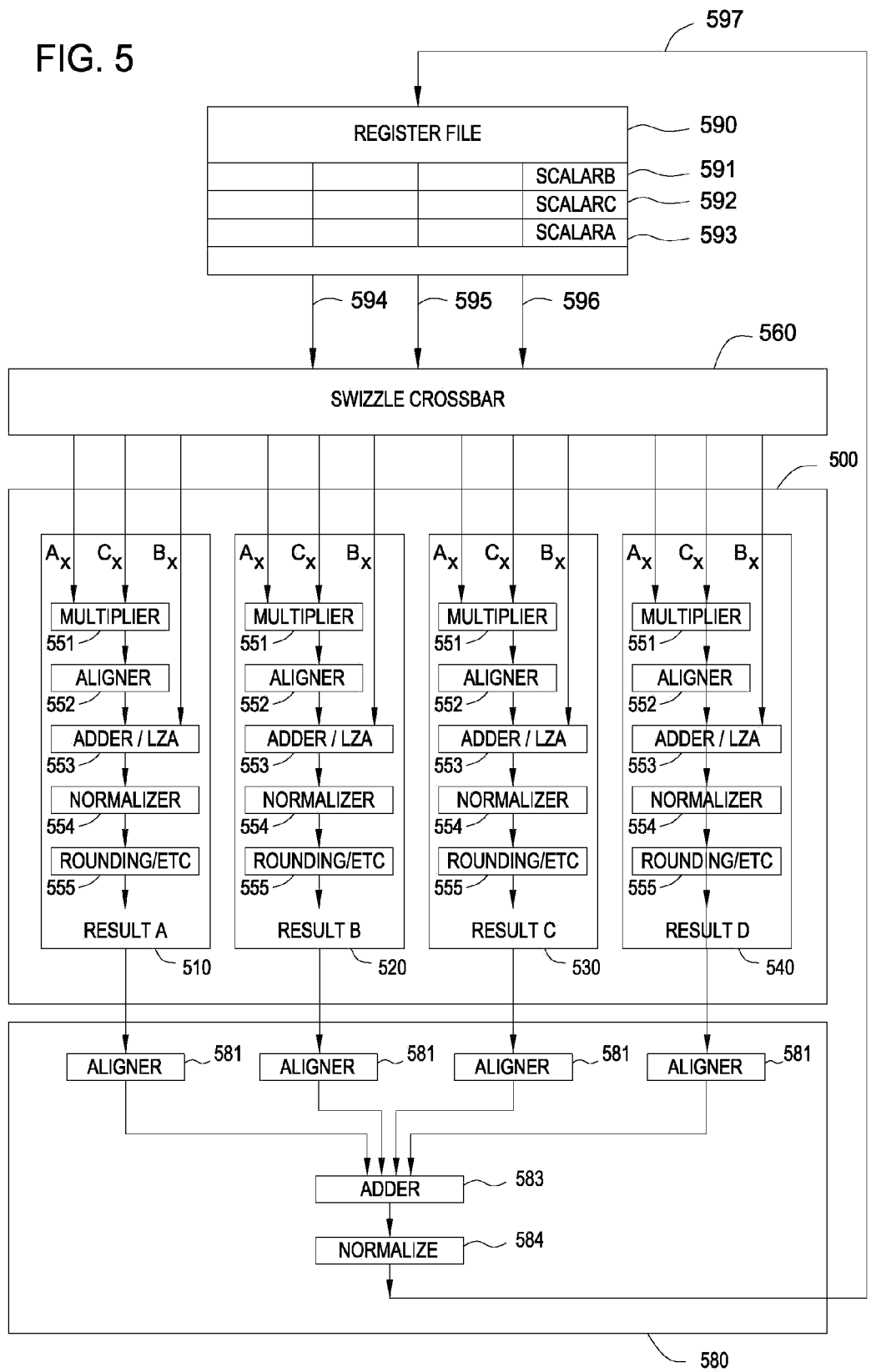
FIG. 5 illustrates another exemplary system according to an embodiment of the invention.

FIG. 5 illustrates an exemplary system according to an embodiment of the invention. Specifically, FIG. 5 illustrates a register file 590, a swizzle crossbar 560, and a more detailed view of components of a vector unit 500 and a dot product unit 580. Vector unit 500 is an embodiment of the vector unit 300 depicted in FIG. 3. As illustrated in FIG. 5, vector unit 500 may include a plurality of processing lanes. For example, four processing lanes 510, 520, 530 and 540 are shown in FIG. 5. Each processing lane may be configured to perform an operation in parallel with one or more other processing lanes. For example, each processing lane may add a pair of operands. By adding different pairs of operands in different processing lanes of the vector unit, addition of more than two operands may be performed faster and more efficiently.

Each processing lane may be pipelined to improve performance. Accordingly, each processing lane may include a plurality of pipeline stages, with each stage performing one or more operations on the operands. For example, each vector lane may include a multiplier 551 for multiplying a pair of operands $A_x$ and $C_x$. Operands $A_x$ and $C_x$ may be derived from one of the lanes coupling the register file with the vector unit, for example, lanes 320 in FIG. 3. In one embodiment of the invention, the multiplication of operands may be performed in a first stage of the pipeline.

Each processing lane may also include an aligner 552 for aligning the product computed by multiplier 551. For example, an aligner 552 may be provided in each processing lane. Aligner 552 may be configured to adjust a decimal point of the product computed by a multiplier 551 to a desirable location in the result. For example, aligner 552 may be configured to shift the bits of the product computed by multiplier 551 by one or more locations, thereby putting the product in desired format. While alignment is shown as a separate pipeline stage in FIG. 5, one skilled in the art will recognize that the multiplication and alignment may be performed in the same pipeline stage.

Each processing lane may also include an adder 553 for adding two operands. In one embodiment (illustrated in FIG. 5), each adder 553 may be configured to receive the product computed by a multiplier, and add the product to another operand $B_x$. Operand $B_x$, like operands $A_x$ and $C_x$, may be derived from one of the lanes connecting the register file to the vector unit. In some embodiments, one of the operands $A_x$ and $C_x$ may be directly provided to the adder 553. Therefore, each adder 553 may be configured to compute a sum of two operands received from the register file. Therefore, a plurality of add operations may be performed simultaneously in parallel in each of the processing lanes.

Each vector processing lane may also include a normalizing stage and a rounding stage, as illustrated in FIG. 5. Accordingly, a normalizer 554 may be provided in each processing lane. Normalizer 554 may be configured to represent a computed value in a convenient exponential format. For example, normalizer may receive the value 0.0000063 as a result of an operation. Normalizer 554 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 552 may be configured to align operand Bx, a product computed by the multiplier, or both. Furthermore, embodiments of the invention are not limited to the particular components described in FIG. 5. Any combination of the illustrated components and additional components such as, but not limited to, leading zero adders, dividers, etc. may be included in each processing lane.

In one embodiment of the invention, vector unit 500 may be configured to execute both vector and scalar instructions. For example, in a particular embodiment, vector unit 500 may include four processing lanes, wherein three processing lanes are used to perform vector operations and one processing lane is configured to perform scalar operations. For example lanes 510-530 may be used to execute vector instructions and lane 540 may be used to execute scalar instructions. In some embodiments, each vector processing lane may be configured to perform both vector and scalar operations.

Dot product unit 580 may correspond to the dot product unit 240 illustrated in FIG. 2. As illustrated in FIG. 5, dot product unit 580 may include a plurality of aligners 581. Each aligner 581 may receive, as an input, the output of an associated vector unit processing lane, as illustrated in FIG. 5. Aligner 581 may be similar to the aligner 552 and may be configured to shift the bits of an input by one or more locations, thereby putting the input in desired format.

The aligned and compressed inputs from the vector unit may be added by an adder 583 of the dot product unit 580. Adder 583 may be similar to the adder 553 and may compute a sum of the inputs received from the compressor 582. In one embodiment of the invention, adder 583 may include a compressor, for example a 4:2 compressor. A 4:2 compressor may receive 4 input addends, and outputs 2 addends (sum/carry). Therefore, a full add of only two addends is necessary.

The sum computed by the adder 583 may be normalized by a normalizer 584. Normalizer 584 may be similar to normalizer 554 and configured to represent a value computed by the adder 583 in a convenient exponential format. Therefore, embodiments of the invention permit the calculation of a sum of more than two operands with a single instruction.

FIG. 5 also illustrates a register file 590. Register file 590 may correspond to the register file 310 illustrated in FIG. 3. Each register in register file 310 may be similar to register 400 illustrated in FIG. 4 and may comprise a plurality of operands. For example, three registers 591-593 are illustrated. Register 591 may include an operand ScalarB, register 592 may include an operand ScalarC, and register 593 may include an operand ScalarA, as illustrated.

The lanes 594-596 coupling the register file 590 to the swizzle crossbar 560 may correspond to the lanes 320 illustrated in FIG. 3. Accordingly, each of the lanes 594-596 may transfer operands from a register of register file 590 to the swizzle crossbar 560. For example, in one embodiment, in response to receiving a multiple operand instruction for adding operands scalarA, scalarB, and scalarC, the contents of registers 591, 592, and 593 may be transferred to the swizzle crossbar.

Swizzle crossbar 560 may be configured to determine an order in which operands from one or more registers of a register file are provided to the vector unit 500. For example, the swizzle crossbar 560 may contain a plurality of operand multiplexors, wherein each operand multiplexor is associated with one of the operands $A_x$, $B_x$, and $C_x$ of vector processing lanes 510-540. Each of the plurality of operand multiplexers may receive a plurality of operands from the register file and select one of the operands.

For example, during execution of the multi operand instruction, the swizzle crossbar may be configured to transfer each of operands scalarA, scalarB, and scalarC to a different vector processing lane of vector unit 500. During execution of the multiple operand instruction, the vector processing lanes 510-540 may be configured to allow each operand to pass through to the dot product unit 580.

In some embodiments, the swizzle crossbar 560 may be configured to transfer one or more predetermined values to each vector processing lane in addition to an operand of the multiple operand instruction. For example, in one embodiment, operand scalarA may be transferred to the $A_x$ input of multiplier 551 in vector processing lane 510. In one embodiment, swizzle crossbar 560 may transfer a value of '1' to the $C_x$ input of multiplier 551 and a value of '0' to the $B_x$ input of adder 553 in vector processing lane 510. Therefore, multiplier 551 may multiply the operand scalarA by '1' and adder 553 may add '0' to operand scalarA, thereby preserving the value of scalarA.

In alternative embodiments, swizzle crossbar 560 may transfer a value of '0' to the $A_x$ and/or $C_x$ inputs of multiplier 551, and operand scalarA to the $B_x$ input of adder 553 in vector processing lane 510. Therefore, multiplier 551 may produce a product of '0' and adder 553 may add '0' to operand scalarA, thereby preserving the value of scalarA. The operand scalarA may pass through normalizer 554 and rounder 555 of the processing lane 510 and be transferred to an aligner 581 of the dot product unit 580. Operands scalarB and scalarC may similarly be transferred through one of processing lanes 520-540 to a respective aligner 581 of dot product unit 580.

Adder 583 of the dot product unit 580 may determine a sum of the operands scalarA, scalarB, and scalarC. The sum of the operands may be normalized by the normalizer 584 and written back to a register in the register file 590 via a write back lane 597. In one embodiment of the invention, one or more masking bits may be used to specify a particular location (or locations) within a register in which the sum is written.

FIG. 6A illustrates a timing diagram for performing an arithmetic operation involving three operands using two operand scalar floating point instructions. Performing the arithmetic operation may involve executing a first instruction 601 configured to perform a first arithmetic operation on a pair of operands A and B. For example, the first instruction may involve adding the operands A and B. As illustrated in FIG. 6A, in one embodiment, executing the first instruction may take four clock cycles (cycles 1-4 in FIG. 6A).

Performing the arithmetic operation may further involve executing a second instruction configured to perform a second arithmetic operation using a result of the first arithmetic operation and a third operand C. Because the second instruction depends on the results of the first instruction, execution of the second instruction may not begin until execution of the first instruction is complete, i.e., in cycle 5, as illustrated in FIG. 6A. In one embodiment of the invention, executing the second instruction may also take four clock cycles (cycles 5-8). Accordingly, performing the arithmetic operation may take a total of eight clock cycles.

FIG. 6B illustrates a timing diagram for performing an arithmetic operation involving three operands using a multiple operand instruction. Because the multiple operand instruction can perform an arithmetic operation involving more than two operands, the arithmetic operation may be performed by issuing a single instruction 603. In one embodiment of the invention, executing instruction 603 may take six clock cycles to allow the operands to pass through the vector processing lanes and the result to be computed in the dot product unit. As can be seen by comparing FIGS. 6A and 6B, the multiple operand instruction computes results of an arithmetic operation involving more than two operands faster, thereby improving efficiency. Furthermore, the use of temporary registers to store intermediate results in avoided.

While adding more than two operands is discussed herein as an example, embodiments of the invention may also be configured to perform a combination of both addition and subtraction operations involving more than two operands using a single multiple operand instruction. For example, in one embodiment, the multiple operand instruction may compute a result of, for example, A+B−C. To perform a subtraction, the sign bits of one or more operands may be flipped. For example, in a particular embodiment, the two's complement of operands to be subtracted (C in the above example) may be derived and sent to an adder to perform a subtraction. Because the operands to be subtracted are represented in two's complement form, an adder may simply add the operands including operands in two's complement form to obtain a result comprising addition and subtraction of operands.

Furthermore, while performing an arithmetic operation with three operands is disclosed herein, embodiments of the invention may perform an arithmetic operation involving any number of operands using a multiple operand instruction. In one embodiment, the number of operands may be based on the number of vector processing lanes available. Furthermore, the dot product unit may include any number of aligners, adders, compressors, and the like to facilitate performing the arithmetic operation using operands received from a plurality of vector processing lanes.

CONCLUSION

By providing a single instruction for computing a sum of more than two operands, embodiments of the invention reduce the number of temporary registers and stall cycles required in computing the sum, thereby improving performance and allowing for efficient use of system resources.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   providing a computer processor, comprising:
      a vector arithmetic unit comprising a plurality of processing lanes, each processing lane configured to, in parallel, perform one or more arithmetic operations on a predefined count of operands;
      a dot product support unit comprising at least one aligner per processing lane, a compressor, and an adder; and
      an operand reordering device comprising a plurality of multiplexors configured to order unorganized operands and transfer an ordered operand and one or more predetermined values to at least one processing lane of the vector arithmetic unit;
   wherein the computer processor is configured to perform a dot product operation by the dot product support unit by aligning and then summing the products generated by the plurality of processing lanes of the vector arithmetic unit;
   receiving, by the computer processor, a single, predefined scalar instruction for adding more than two floating point addends, wherein the predefined instruction is identifiable by an associated opcode; and
   responsive to the predefined scalar instruction for adding more than two floating point addends, performing, by the operand reordering device, the vector arithmetic unit, and the dot product support unit of the computer processor, a predefined operation to add the more than two floating point addends using a single pass through the processing lanes of the computer processor.

2. The computer-implemented method of claim 1, wherein the more than floating point addends are received from one or more registers in a register file.

3. The computer-implemented method of claim 2, wherein each register in the register file comprises a plurality of operands.

4. The computer-implemented method of claim 1, wherein each processing lane of the vector arithmetic unit comprises an adder, a multiplier, an aligner, and a normalizer.

5. A computer-implemented method for computing a sum of three operands floating point addends, comprising:
   providing a computer processor, comprising:
      a vector arithmetic unit comprising four processing lanes, each processing lane configured to, in parallel, perform one or more arithmetic operations on three operands;

a dot product support unit comprising at least one aligner per processing lane, a compressor, and an adder configured to compute a sum of three operands; and an operand reordering device comprising a plurality of multiplexors configured to order unorganized operands and transfer an ordered operand and two predetermined values to at least one processing lane of the vector arithmetic unit;

wherein the computer processor is configured to perform a dot product operation by the dot product support unit by aligning and then summing the products generated by the plurality of processing lanes of the vector arithmetic unit;

by the computer processor, receiving a single, predefined scalar instruction for adding the three floating point addends, wherein the predefined instruction is identifiable by an associated opcode; and responsive to the predefined scalar instruction for adding the three floating point addends, performing, by the operand reordering device, the vector arithmetic unit, and the dot product support unit of the computer processor, a predefined operation to add the three floating point addends using a single pass through the processing lanes of the computer processor.

6. The computer-implemented method of claim 5, wherein the three floating point addends are received from one or more registers in a register file, wherein each register in the register file comprises a plurality of operands.

7. The computer-implemented method of claim 5, wherein each vector processing lane of the vector arithmetic unit comprises an adder, a multiplier, an aligner, and a normalizer.

8. A system comprising a plurality of processors communicably coupled with one another, wherein each processor comprises:

a register file comprising a plurality of registers, each register comprising a plurality of operands;

a vector arithmetic unit comprising a plurality of processing lanes, each processing lane configured to, in parallel, perform one or more arithmetic operations on a predefined count of operands;

a dot product support unit comprising at least one aligner per processing lane, a compressor, and an adder; and an operand reordering device comprising a plurality of multiplexors configured to order unorganized operands and transfer an ordered operand and one or more predetermined values to at least one processing lane of the vector arithmetic unit;

wherein the computer processor is configured to perform a dot product operation by the dot product support unit by aligning and then summing the products generated by the plurality of processing lanes of the vector arithmetic unit;

by the computer processor, receiving a single, predefined scalar instruction for adding more than two floating point addends, wherein the predefined instruction is identifiable by an associated opcode; and responsive to the predefined scalar instruction for adding more than two floating point addends, performing, by the operand reordering device, the vector arithmetic unit, and the dot product support unit of the computer processor, a predefined operation to add the more than two floating point addends using a single pass through the processing lanes of the computer processor.

9. The system of claim 8, wherein each processing lane of the vector arithmetic unit comprises an adder, a multiplier, an aligner, and a normalizer.

10. The system of claim 8, wherein the dot product unit comprises at least one aligner and a normalizer.

11. The computer-implemented method of claim 1, wherein the more than two floating point addends are received from one or more registers in a register file, wherein the registers contain unorganized vector and scalar data, wherein the predefined operation comprises:

programming the operand reordering device to specify an order by which the more than two floating point addends are to be ordered;

transferring the more than two floating point addends to the operand reordering device;

reordering, by the operand reordering device, the more than two floating point addends;

transferring, from the operand reordering device, each of the reordered floating point addends and a corresponding first and second predetermined value to a respective one of a plurality of processing lanes of the vector arithmetic unit;

computing, in parallel, in each of one or more of a plurality of processing lanes of the vector arithmetic unit, a first arithmetic result, wherein the first arithmetic result is equal to the respective reordered floating point addend;

transferring the first arithmetic result of each reordered floating point addend and the first and second predetermined values from the one or more processing lanes of the vector unit to the dot product support unit; and computing a second arithmetic result in the dot product support unit, the second arithmetic result being an arithmetic result of aligning, compressing, and adding each first arithmetic result received from the one or more processing lanes, to generate a normalized result of adding more than two floating point addends.

12. The computer-implemented method of claim 11, wherein each processing lane is configured to support a predefined count of floating point addends, wherein the more than two floating point addends is equal to at most a predefined count of floating point addends, wherein the predefined count of floating point addends is equal to a product of: (i) a count of the plurality of processing lanes and (ii) the predefined count of operands; wherein the plurality of processing lanes is fewer in number than the predefined count of floating point addends.

13. The computer-implemented method of claim 12, wherein the at most the predefined count of floating point addends is three, wherein the count of the plurality of processing lanes of the vector arithmetic unit is four, wherein the predefined count of floating point addends supported by each processing lane is one, and wherein the computer processor is configured to sum the three floating point addends in a single pass through the four processing lanes of the vector arithmetic unit.

14. The computer-implemented method of claim 13, wherein computing the first arithmetic result comprises:

computing a first product by multiplying, in the multiplier, a first and a second of the (i) first predetermined value, (ii) second predetermined value, and (iii) respective floating point addend; and adding, in the adder, the first product and a third of the (i) first predetermined value, (ii) second predetermined value, and (iii) respective floating point addend;

wherein the first arithmetic result is equal to the value of the respective floating point addend.

15. The computer-implemented method of claim 14, wherein at least a first vector processing lane of the vector arithmetic unit is configured to perform a scalar arithmetic operation in parallel with at least a second vector processing lane of the vector arithmetic unit performing a vector arithmetic operation, wherein the normalized arithmetic result is computed without incurring any pipeline stalls associated with issuing multiple instructions to add the predefined count of floating point addends.

16. The computer-implemented method of claim 5, wherein the three floating point addends are received from one or more registers in a register file, wherein each register in the register file comprises a plurality of operands, wherein the registers contain unorganized vector and scalar data, wherein the predefined operation comprises:
   programming the operand reordering device to specify an order by which the three floating point addends are to be ordered;
   transferring the three floating point addends to the operand reordering device;
   reordering, by the operand reordering device, the three floating point addends;
   transferring, from the operand reordering device, each of the three reordered floating point addends and a corresponding first and second predetermined value to a respective one of a plurality of processing lanes of the vector arithmetic unit;
   computing, in parallel, in each of three processing lanes of the vector arithmetic unit, a first arithmetic result, wherein the first arithmetic result is equal to the respective reordered floating point addend;
   transferring the first arithmetic result of each reordered floating point addend and the first and second predetermined values from the three processing lanes of the vector unit to the dot product support unit; and
   computing a second arithmetic result in the dot product support unit, the second arithmetic result being an arithmetic result of aligning, compressing, and adding each first arithmetic result received from the one or more processing lanes, to generate a normalized result of adding three floating point addends.

17. The computer-implemented method of claim 16, wherein computing the first arithmetic result comprises:
   computing a first product by multiplying, in the multiplier, a first and a second of the (i) first predetermined value, (ii) second predetermined value, and (iii) respective floating point addend; and
   adding, in the adder, the first product and a third of the (i) first predetermined value, (ii) second predetermined value, and (iii) respective floating point addend;
   wherein the first arithmetic result is equal to the value of the respective floating point addend.

18. The system of claim 8, wherein the predefined operation comprises:
   programming the operand reordering device to specify an order by which the more than two floating point addends are to be ordered;
   transferring, from the register file, the more than two floating point addends to the operand reordering device;
   reordering, by the operand reordering device, the more than two floating point addends;
   transferring, from the operand reordering device, each of the reordered floating point addends and a corresponding first and second predetermined value to a respective one of a plurality of processing lanes of the vector arithmetic unit;
   computing, in parallel, in each of one or more of a plurality of processing lanes of the vector arithmetic unit, a first arithmetic result, wherein the first arithmetic result is equal to the respective reordered floating point addend;
   transferring the first arithmetic result of each reordered floating point addend and the first and second predetermined values from the one or more processing lanes of the vector unit to the dot product support unit; and
   computing a second arithmetic result in the dot product support unit, the second arithmetic result being an arithmetic result of aligning, compressing, and adding each first arithmetic result received from the one or more processing lanes, to generate a normalized result of adding more than two floating point addends.

19. The system of claim 18, wherein each processing lane is configured to support a predefined count of floating point addends, wherein the more than two floating point addends is equal to at most a predefined count of floating point addends, wherein the predefined count of floating point addends is equal to a product of: (i) a count of the plurality of processing lanes and (ii) the predefined count of operands; wherein the plurality of processing lanes is fewer in number than the predefined count of floating point addends.

20. The system of claim 19, wherein the at most the predefined count of floating point addends is three, wherein the count of the plurality of processing lanes of the vector arithmetic unit is four, wherein the predefined count of floating point addends supported by each processing lane is one, and wherein the computer processor is configured to sum the three floating point addends in a single pass through the four processing lanes of the vector arithmetic unit.

21. The system of claim 20, wherein computing the first arithmetic result comprises:
   computing a first product by multiplying, in the multiplier, a first and a second of the (i) first predetermined value, (ii) second predetermined value, and (iii) respective floating point addend; and
   adding, in the adder, the first product and a third of the (i) first predetermined value, (ii) second predetermined value, and (iii) respective floating point addend;
   wherein the first arithmetic result is equal to the value of the respective floating point addend.

22. The system of claim 21, wherein at least a first vector processing lane of the vector arithmetic unit is configured to perform a scalar arithmetic operation in parallel with at least a second vector processing lane of the vector arithmetic unit performing a vector arithmetic operation, wherein the normalized arithmetic result is computed without incurring any pipeline stalls associated with issuing multiple instructions to add the predefined count of floating point addends.

* * * * *